No. 722,565. PATENTED MAR. 10, 1903.
F. W. COOLBAUGH.
FULCRUM FOR BRAKE BEAMS.
APPLICATION FILED NOV. 9, 1901.
NO MODEL.

WITNESSES:
F. Stallman
E. H. Oetjen

INVENTOR
F. W. Coolbaugh
by Oscar Grimm
ATTORNEY

UNITED STATES PATENT OFFICE.

FRANK W. COOLBAUGH, OF EASTON, PENNSYLVANIA.

FULCRUM FOR BRAKE-BEAMS.

SPECIFICATION forming part of Letters Patent No. 722,565, dated March 10, 1903.

Application filed November 9, 1901. Serial No. 81,751. (No model.)

*To all whom it may concern:*

Be it known that I, FRANK W. COOLBAUGH, a citizen of the United States, and a resident of Easton, in the county of Northampton and State of Pennsylvania, have invented certain new and useful Improvements in Fulcrums for Brake-Beams, of which the following is a specification.

This invention relates to improvements in brake-beams for railway-cars, and more particularly to improvements in the fulcrum by means of which the brake-lever is pivoted to the brake-beam.

The object of my invention is to provide a new and improved brake-beam fulcrum which is simple in construction, strong, durable, reliable, easily applied, and which permits of ready adjustment for a brake-lever inclined to either side.

Figure 1:
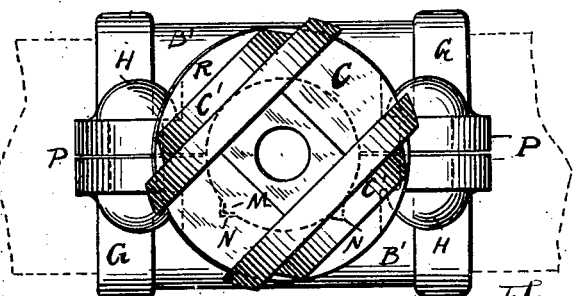
Figure 2:
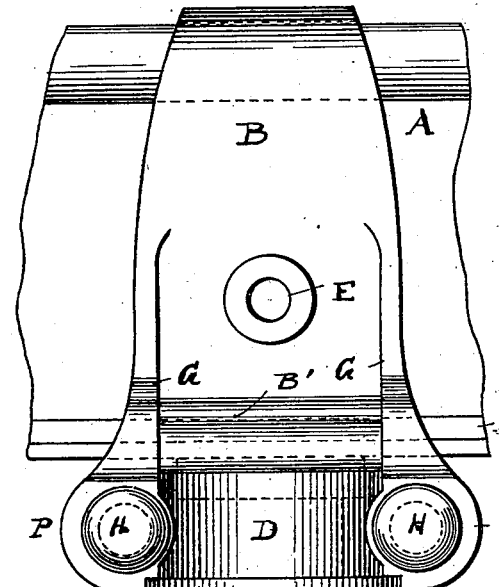
Figure 3:
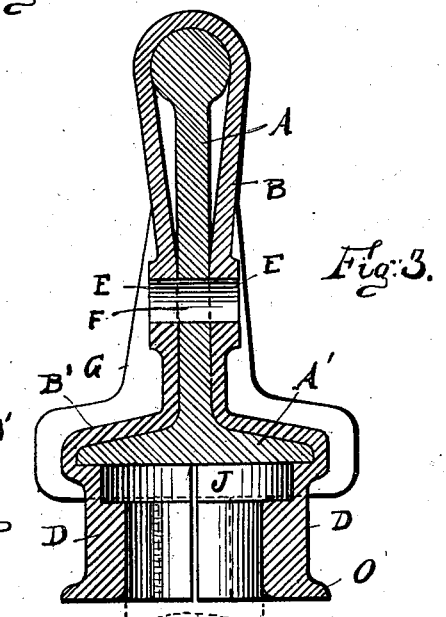
Figure 4:
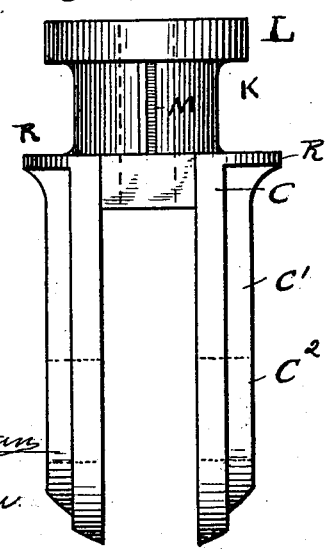

In the accompanying drawings, in which like letters of reference indicate like parts in all the figures, Figure 1 is an end view of my improved brake-beam fulcrum. Fig. 2 is a side view of the same, the two parts being detached. Fig. 3 is a transverse sectional view through the brake-beam and the clamp part of the fulcrum on the beam. Fig. 4 is an end view of the forked section of the fulcrum.

The brake-beam A is made of rolled steel in the well-known shape of a deck-beam.

My improved fulcrum is composed of two main parts—the clamp or yoke B, applied on the brake-beam direct, and the fork C, which is swiveled in the clamp.

The flanges A' of the brake-beam face the wheel-tires, and the brake-beam, when the brakes are applied, must be pulled in the direction from the bulb of the beam toward the flanges. The yoke or clamp B is substantially U-shaped, and at the ends of its shanks has lateral extensions B', which fit on the flanges A' and overlap the edges. On the outer end of each of the two lateral extensions A' a half-round half-socket D is formed, which when the clamp B is applied on the beam project from the flanged edge and form a cylindrical socket. The clamp is provided in each shank with a hole E, which can register with each other and with a hole F in the web of the beam, and through which holes E F a rivet can be passed for holding the clamp close on the beam and preventing forcible shifting in the direction of the length of the beam. Along each edge of each shank of the clamp a strengthening flange or rib G is formed, which terminates at the side edges of the half-sockets D in wings P in line with a diametrical line drawn across the end edges of the half-sockets, and these wings have holes for receiving rivets H, by which the two half-sockets are held together in front of the flanges A'. The half-sockets D are each provided at the inner end with a half-round internal rabbet J.

The fork C, between the shanks C' of which the brake-lever is to be pivoted by a bolt passing through the holes $C^2$ in said shanks and a hole in the brake-lever, is provided at its inner closed end with a neck K, fitting in between the two half-sockets when they are closed, and this neck K is provided on its free end with an annular flange L, fitting in the annular groove formed between the rabbets J and the face of the flanges A'. The neck K has a longitudinal spline M, and one of the half-sockets D has two longitudinal grooves N, separated a quarter of a circle and each adapted to receive the spline M. The half-sockets each have an external flange O at the outer end, and the fork C has an external flange R at the base of the neck K, which flanges O and R serve to relieve the neck K from some of the bending strain. When the brake-lever is to be inclined from the lower left to the upper right, as shown in Fig. 1, the spline M is in the left-hand groove N, and when the brake-lever is to be inclined from the lower right to the upper left the neck K must be turned axially to bring the spline M into the right-hand groove N. This can only be done before the rivets H are inserted. The clamp B is applied on the beam, the neck K is inserted between the half-sockets D and is turned axially, according to the desired inclination of the brake-lever, and then the rivets H and the rivet through the holes E F are inserted. Thereby the half-sockets D are drawn close together and the spline M brought into the corresponding groove N, which locks the fork permanently in place with the desired inclination. One style of fulcrum can thus be used on all beams whether the brake-lever is inclined to the right or left.

I am aware that trussed brake-beams have been constructed with an axially-adjustable fulcrum and do not claim this broadly.

Having described my invention, what I claim as new, and desire to secure by Letters Patent, is—

1. An adjustable fulcrum for brake-beams composed of two parts, namely: a separable clamp to be applied on the brake-beam and having two half-sockets and a fork having a neck fitting between said half-sockets, substantially as described.

2. An adjustable fulcrum for brake-beams, composed of a clamp to be applied on the beam and having a cylindrical socket provided with longitudinal grooves and a fork having a neck fitting in said socket and having a longitudinal spline, fitting in either of said grooves, substantially as herein shown and described.

3. In a fulcrum for brake-beams, the combination with a clamp having two half-sockets, of a fork having a neck held rigidly between said half-sockets, substantially as described.

4. In a fulcrum for brake-beams, the combination with a clamp, having two half-sockets, of a fork having a neck fitting between said half-sockets and means for preventing movement of said neck between the said half-sockets, substantially as set forth.

5. In a fulcrum for brake-beams, the combination with a clamp having two half-sockets provided at their inner ends each with a rabbet, of a fork having a neck held rigidly between said half-sockets and having an annular flange at its inner end, said flange fitting on the rabbets at the inner ends of the half-sockets, substantially as described.

6. In a fulcrum for brake-beams, the combination with a flanged brake-beam, of a clamp having two half-sockets and applied on said brake-beam, a rivet passed through the web of the beam and the clamp and two rivets passed through wings on said clamp at the sides of the half-sockets and beyond the flange of the beam, substantially as described.

7. The combination with a clamping-block adapted to substantially surround a brake-beam, of a lever-post mounted in said clamping-block, and means for locking said lever-post in position in said clamping-block; substantially as described.

8. The combination with a clamping-block adapted to substantially surround a brake-beam, of a lever-post mounted in said clamping-block, and means for locking said lever-post in fixed position in said clamping-block; substantially as described.

9. The combination with a clamping-block adapted to substantially surround a brake-beam, of a flanged lever-post mounted in said clamping-block, and means for locking said lever-post in position in said clamping-block; substantially as described.

10. The combination with a clamping-block adapted to substantially surround a brake-beam, of a flanged lever-post forked at its free end and mounted in said clamping-block, and means for locking said lever-post in position in said clamping-block; substantially as described.

11. The combination with a clamping-block adapted to substantially surround a brake-beam, of a lever-post mounted in said clamping-block, and means for locking said lever-post in position against rotation in said clamping-block; substantially as described.

12. The combination with a clamping-block adapted to substantially surround a brake-beam, of lateral flanges on said clamping-block adapted for securing means therethrough, a lever-post mounted in said clamping-block, and means for locking said lever-post in position in said clamping-block; substantially as described.

13. The combination with a brake-beam, of a clamping-block adapted to substantially surround said brake-beam, a lever-post mounted in said clamping-block, and means for locking said lever-post in position in said clamping-block; substantially as described.

14. The combination with a brake-beam, of a clamping-block adapted to substantially surround said brake-beam, a lever-post mounted in said clamping-block, and means for locking said lever-post in fixed position in said clamping-block; substantially as described.

15. The combination with a brake-beam, of a clamping-block adapted to substantially surround said brake-beam, a flanged lever-post mounted in said clamping-block, and means for locking said lever-post in position in said clamping-block; substantially as described.

16. The combination with a brake-beam, of a clamping-block adapted to substantially surround said brake-beam, a lever-post provided with lateral flange on its inner end mounted in said clamping-block, and means for locking said lever-post in position in said clamping-block; substantially as described.

17. The combination with a brake-beam, of a clamping-block adapted to substantially surround said brake-beam, perforated, lateral flanges on said clamping-block, and means for locking said lever-post in position in said clamping-block; substantially as described.

18. The combination with a clamping-block adapted to substantially surround a brake-beam, of a forked lever-post mounted in said clamping-block between two half-sockets therein, and means for holding said lever-post in position in said block; substantially as described.

19. The combination with a clamping-block adapted to substantially surround a brake-beam, of a forked lever-post mounted in said clamping-block between two half-sockets therein, and means for holding said lever-post in position against rotation in said block; substantially as described.

20. The combination with a clamping-block adapted to substantially surround a brake-beam, of a forked lever-post mounted in said clamping-block between two half-sockets therein, lateral flanges on said lever-post within said half-sockets, and means for holding said lever-post in position in said block; substantially as described.

21. The combination with a clamping-block adapted to substantially surround a brake-beam, perforated lateral flanges on said clamping-block, a forked lever-post mounted in said clamping-block between two half-sockets therein, and means for holding said lever-post in position in said block; substantially as described.

22. The combination with a brake-beam, of a clamping-block adapted to substantially surround said brake-beam, a forked lever-post mounted in said clamping-block between two half-sockets therein, and means for holding said lever-post in position in said block; substantially as described.

23. The combination with a brake-beam, of a clamping-block adapted to substantially surround said brake-beam, a forked lever-post mounted in said clamping-block between two half-sockets therein, and means for holding said lever-post in position against rotation in said block; substantially as described.

24. The combination with a brake-beam, of a clamping-block adapted to substantially surround said brake-beam, a forked lever-post mounted in said clamping-block between two half-sockets therein, lateral flanges on said lever-post within said half-sockets, and means for holding said lever-post in position in said block; substantially as described.

25. The combination with a brake-beam, of a clamping-block adapted to substantially surround said brake-beam, perforated lateral flanges on said clamping-block, a forked lever-post mounted in said clamping-block between two half-sockets therein, and means for holding said lever-post in position in said block; substantially as described.

Signed at Easton, in the county of Northampton and State of Pennsylvania, this 23d day of April, A. D. 1901.

FRANK W. COOLBAUGH.

Witnesses:
JAMES M. DIEHL,
OSCAR F. GUNZ.